US011108337B2

(12) United States Patent
Meeks (10) Patent No.: US 11,108,337 B2
(45) Date of Patent: Aug. 31, 2021

(54) VOLTAGE LIMITING SYNCHRONOUS RECTIFICATION CIRCUIT

(71) Applicant: NXP B.V., Eindhoven (NL)

(72) Inventor: Daniel Meeks, Austin, TX (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/523,544

(22) Filed: Jul. 26, 2019

(65) Prior Publication Data

US 2021/0028718 A1 Jan. 28, 2021

(51) Int. Cl.
*H02M 7/217* (2006.01)
*H02J 50/12* (2016.01)

(52) U.S. Cl.
CPC ............. *H02M 7/217* (2013.01); *H02J 50/12* (2016.02)

(58) Field of Classification Search
CPC ................................ H02M 7/217; H02J 50/12
USPC ........................................................ 363/127
See application file for complete search history.

(56) References Cited

U.S. PATENT DOCUMENTS

| 8,320,143 B2 | 11/2012 | Leibovitz |
| 9,391,530 B2 * | 7/2016 | Fang ................. H02M 3/33592 |
| 9,590,523 B2 | 3/2017 | Hui et al. |
| 2002/0196002 A1 * | 12/2002 | Diallo ............... H02M 3/33592 323/276 |
| 2017/0085183 A1 * | 3/2017 | Notsch .................... H02M 1/12 |
| 2019/0097447 A1 * | 3/2019 | Partovi ................. H01F 27/288 |

* cited by examiner

*Primary Examiner* — Shawki S Ismail
*Assistant Examiner* — Monica Mata (57) ABSTRACT

A rectifier includes a first stage to convert an AC signal to a first rectified signal and a second stage to convert the AC signal to a second rectified signal. Each stage includes a MOSFET, a differential amplifier with a predetermined gain, and an analog buffer coupled to the output of the differential amplifier. The differential amplifier generates an amplified signal based on a difference between an input signal voltage and an output signal voltage. The analog buffer outputs a gate signal to switch the MOSFET based on the amplified signal. Switching of the MOSFET converts the AC signal corresponding to the input signal voltage to a corresponding one of the first rectified signal and the second rectified signal. The first and second rectified signals may be combined to form a DC signal for driving a load.

19 Claims, 9 Drawing Sheets

VOLTAGE LIMITING SYNCHRONOUS RECTIFICATION CIRCUIT

TECHNICAL FIELD

Example embodiments disclosed herein relate generally to performing voltage conversions.

BACKGROUND

The efficiency of power transfer is a critical feature of wireless power systems, especially for small devices and higher power applications. Thermal rise inside consumer equipment, or in industrial equipment designed to operate at high ambient temperatures, should be reduced as much as possible to secure the safety and reliability of host devices.

Various attempts have been made to improve power transfer efficiency in wireless systems that operate at lower power levels. One approach involves using a full-bridge circuit configured with four low-loss diodes (Schottky or Super-barrier, for example). Another approach involve using a pair of low-loss transistors (e.g., MOSFETs) plus a pair of diodes. This latter approach has been taken in hybrid systems in an attempt to reduce losses and thermal rise.

Unfortunately, low-power solutions have proven inadequate for higher power applications. For example, these solutions are unable to reduce power losses that occur in the rectification of an AC input in a wireless power transfer application, and especially those implemented in physically smaller and/or higher temperature environments. Additionally, low-power solutions are unable to adequately limit thermal rise beyond what diodes can accomplish.

SUMMARY

A brief summary of various example embodiments is presented below. Some simplifications and omissions may be made in the following summary, which is intended to highlight and introduce some aspects of the various example embodiments, but not to limit the scope of the invention. Detailed descriptions of example embodiments adequate to allow those of ordinary skill in the art to make and use the inventive concepts will follow in later sections.

In accordance with one or more embodiments, a rectifier includes a MOSFET transistor, a differential amplifier with a predetermined gain, and an analog buffer coupled to the output of the differential amplifier, wherein the differential amplifier is configured to generate an amplified signal based on a difference between an input signal voltage and an output signal voltage and wherein the analog buffer is configured to output a gate signal for switching the MOSFET transistor based on the amplified signal, switching of the MOSFET transistor converting an AC signal corresponding to the input signal voltage to a rectified DC signal corresponding to the output signal voltage. The differences between the input signal voltage and the output signal voltage may be based on a voltage drop across the MOSFET transistor.

The differential amplifier may include a first input based on a first biasing current and the input signal voltage and a second input based on a second biasing current and the output signal voltage, wherein the second biasing current may be different from the first biasing current. The first input and the second input of the differential amplifier may change based on oscillation of the AC signal corresponding to the input signal voltage. The gate signal of the MOSFET transistor may change based on changes in the first input and the second input into the differential amplifier. The analog buffer may be enabled and disabled based on input signal voltage of the AC signal.

The rectifier may include a first diode coupled to a first input of the differential amplifier and a second diode coupled to a second input of the differential amplifier, wherein the first and second diodes block reverse current flow from a signal path including the MOSFET transistor to the differential amplifier. The predetermined gain may be 100 or more. The rectified DC signal may be a half-wave rectified signal.

In accordance with one or more embodiments, a rectifier includes a first stage configured to convert an AC signal into a first rectified signal and a second stage configured to convert the AC signal into a second rectified signal, wherein each of the first stage and the second stage includes: (a) a MOSFET transistor, (b) a differential amplifier with a predetermined gain and (c) an analog buffer coupled to the output of the differential amplifier, wherein the differential amplifier is configured to generate an amplified signal based on a difference between an input signal voltage and an output signal voltage and wherein the analog buffer is configured to output a gate signal for switching the MOSFET transistor based on the amplified signal, switching of the MOSFET transistor converting the AC signal corresponding to the input signal voltage to a corresponding one of the first rectified signal and the second rectified signal. The first rectified signal may be shifted in phase relative to the second rectified signal to generate a DC signal, the first rectified signal corresponding to a first portion of the AC signal and the second rectified signal corresponding to a second portion of the AC signal different from the first portion of the AC signal.

The rectifier may include a capacitor coupled to a node commonly connected to the first and second stages. The rectifier may include the first stage is configured to generate a first current and the second stage is configured to generate a second current, wherein the first current and the second current are alternately applied to the capacitor through the node in order to generate the DC signal. The rectifier may include a bias circuit configured to generate a bias for the first and second stages. The bias circuit may generate the bias based on the first rectified signal and the second rectified signal.

The rectifier may include a voltage regulator to limit the first rectified signal and the second rectified signal for input into the bias circuit. The bias circuit may include a first MOSFET and a second MOSFET, and the first MOSFET, the second MOSFET, the MOSFET in the first stage, and the MOSFET in the second stage may form a full-bridge circuit. The rectifier may include a first voltage limiter configured to limit the gate-to-source voltage of the first MOSFET and a second voltage limiter configured to limit the gate-to-source voltage of the second MOSFET. The AC signal may be generated based on output of a wireless power transfer coil.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

DETAILED DESCRIPTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Figure 1:
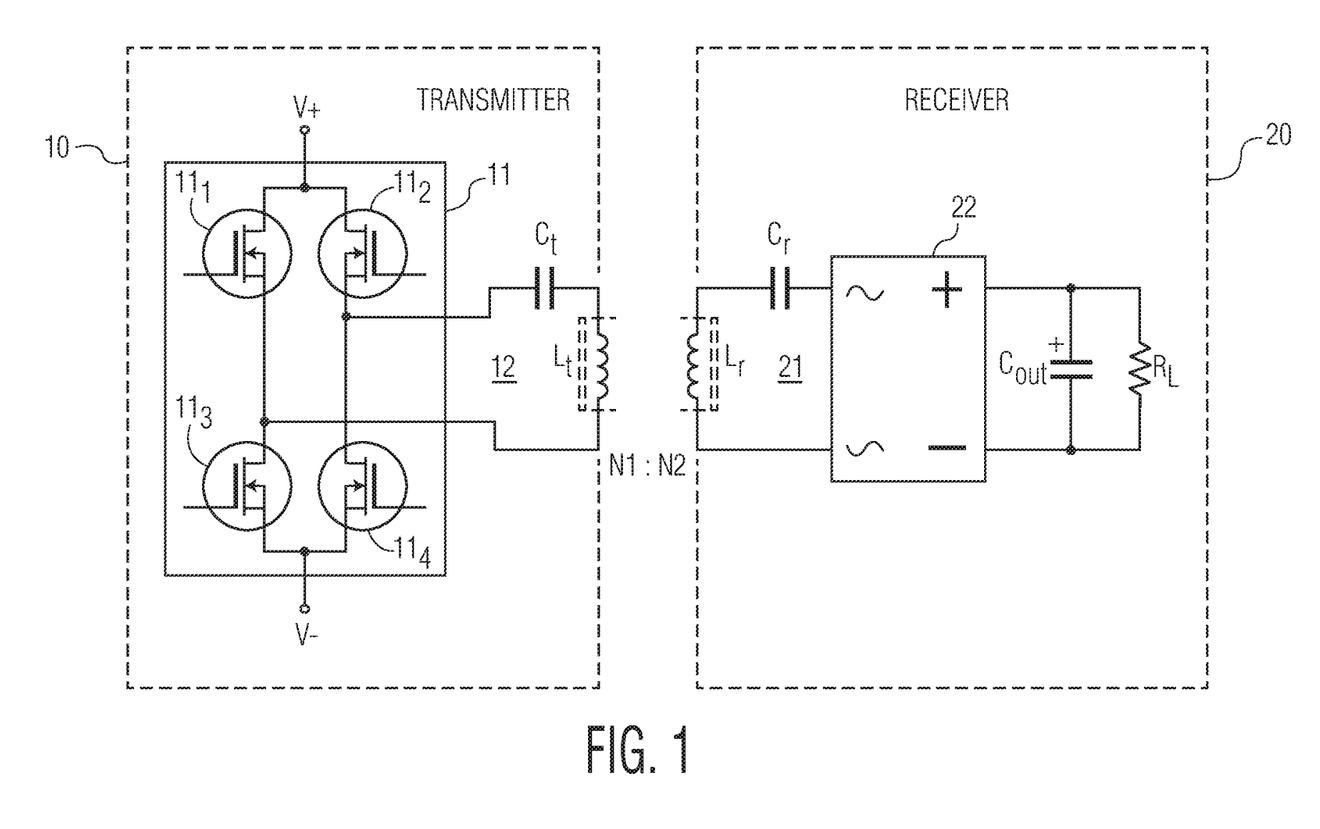
FIG. 1 illustrates an example of a wireless power transfer application.

FIG. 1 illustrates an example of a wireless power transfer application implemented between a transmitter 10 and a receiver 20. The transmitter 10 includes a bridge circuit 11 coupled to an LC circuit 12. In this example, the bridge circuit 11 is formed from four NMOS transistors $11_1$ to $11_4$ connected in a full-bridge configuration between positive and negative power sources V+ and V−. The transistors in the bridge circuit may be switched, for example, by a control circuit (not shown) to generate an AC power signal in cooperation with the LC circuit 12. The LC circuit 12 includes a capacitor $C_t$ coupled to a coil $L_t$ forming one half of a transformer circuit for wirelessly transferring power to the receiver through magnetic coupling with the coil $L_r$ in the receiver.

The receiver 20 includes an LC circuit 21 and a synchronous rectifier 22. The LC circuit 21 includes the coil $L_r$ coupled to a resonating capacitor $C_r$. The coil $L_r$ may have a different number of windings than the coil $L_t$ in the transmitter. For example, the number of windings (N2) of coil $L_r$ may be greater than the number of windings (N1) of coil $L_t$ in order to generate a stepped-up voltage of the AC power signal wirelessly received from the transmitter. The relative number of windings of $L_r$ and $L_t$ may be set according to a predetermined transformer ratio (N1:N2). The synchronous rectifier 22 converts the received AC power signal to a DC power signal, which is then used to charge capacitor $C_{OUT}$ in the receiver before being transferred to a load, symbolically represented as $R_L$. The capacitor $C_{OUT}$ may store a voltage that serves as a reference for purposes of generating the rectified DC output. The capacitor $C_{OUT}$ may also filter out spurious signals (e.g., harmonics) in some embodiments.

In one embodiment, the AC power signal received by the receiver 20 may be an approximate sinusoidal signal as a result of being shaped by the receiver coil $L_r$ and resonating capacitor $C_r$, e.g., the receiver coil and resonating capacitor may distort the received signal to some degree that causes this signal to deviate from a well-defined sinusoid or other defined waveform.

The synchronous rectifier 22 may operate as an ideal diode bridge to convert the AC power signal to a DC power signal in spite of this distortion. Such a conversion may be performed, for example, for small devices and/or higher power applications at higher frequencies. The higher power application may be one that provides, for example, 65 watts of power or more to the load. This power range is provided as an example and may be lower than 65 watts in other embodiments. The higher frequencies may, for example, be in the range of 100 KHz or greater. In one embodiment, the synchronous rectifier 22 only allows current flow to the load when the peak of the rectified AC voltage is greater than the voltage stored in the output Cout. This may be accomplished using a number of analog control circuits that allows for high frequency operation in the range of 100 KHz or more.

Figure 2:
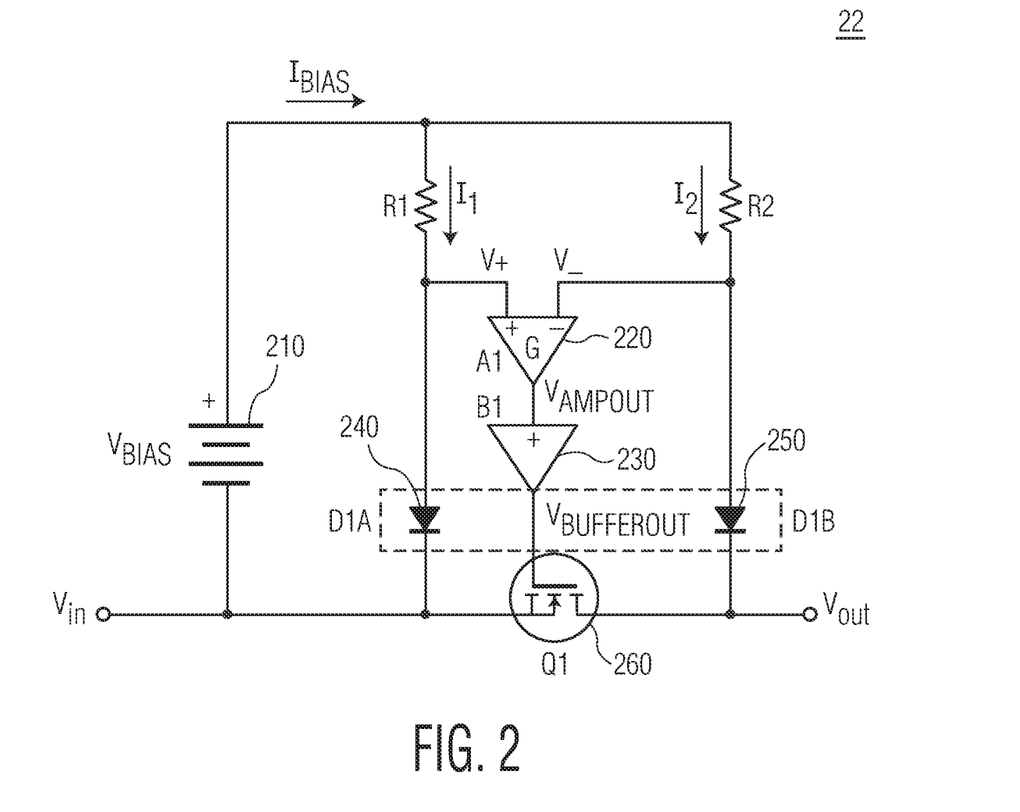
FIG. 2 illustrates an embodiment of a synchronous rectifier.

FIG. 2 illustrates an embodiment of the synchronous rectifier 22 which is coupled between an input voltage terminal $V_{IN}$ and an output voltage terminal $V_{OUT}$. The rectifier 22 includes a transistor (Q1) 260 which is selectively switched in order to generate the output voltage $V_{OUT}$ of the DC power signal. The level of the output voltage $V_{OUT}$ is within a predetermined range, which may be determined, for example, based on the intended application, e.g., based on requirements of the load.

Referring to FIG. 2, the synchronouis rectifier 22 includes a bias current source 210, a high-gain analog (differential) amplifier (A1) 220, an analog buffer 230, and a pair of matched signal diodes 240 and 250 respectively coupled to source and drain (or drain and source) of transistor 260. In one embodiment, transistor 260 may be a metal-oxide-semiconductor field effect transistor (MOSFET) which is coupled to the capacitor $C_{OUT}$ and load $R_L$, as illustrated, for example, in FIG. 1. In one embodiment, transistor 260 may be an NMOS transistor (although a PMOS transistor may be used in another embodment).

The bias current source 210 may include a battery (or other voltage source) that supplies a predetermined bias current $I_{BIAS}$ based on a supply voltage $V_{BIAS}$. The bias current is used to generate biasing currents $I_1$ and $I_2$ based on the values of resistors R1 and R2, respectively. In one embodiment, the values of resistors R1 and R2 may be different in order to generate different levels of the biasing current $I_1$ and $I_2$ relative to the input of the differential amplifier 220. For example, R1 may have a resistance less than R2 by a predetermined factor in order to generate the different levels of biasing current. In another embodiment, R1 and R2 may have the same resistance values.

The differential amplifier 220 amplifies the difference (ΔV) between its input voltages V+ and V− based on a predetermined gain G. In one embodiment, the gain G may be set so that the output voltage of the amplifier ($V_{AMPOUT}$=G·ΔV) falls within a first range corresponding to a logical 0 value or a second range corresponding to a logical 1 value, depending on the operation and timing of the circuit. The output voltage ($V_{AMPOUT}$) of the differential amplifier 220 is used as a basis for controlling the switching state of the transistor 260. In one emodiment (described in greater detail below), the differential amplifier 220 may include bipolar junction transistors that are operating in the linear range, so that they are not fully turned on or fully turned off during all or predetermined periods of operation of the rectifier. This allows the output of the differential amplifier to control switching of the transistor 260 at a fast range, which, in turn, may efficiently control rectification of the input AC power signal into a DC power signal. In one embodiment, the gain G may be 100 or more, but may be a different value in other embodiments provided the transistor 260 operates in a manner sufficient to produce the rectified output signal.

The analog buffer 230 drives the gate of the transistor 260 based on the amplified voltage $V_{AMPOUT}$ output from the differential amplifier 220. In one embodiment, the analog buffer may drive the gate voltage of the transistor 260 with a unity gain, e.g., $G_{BUFFER}$=1. In this case, the voltage value of $V_{AMPOUT}$ itself corresponds to different logical values for switching the transistor 260. In another embodiment, $G_{BUFFER}$ may be a predetermined value different from one. In this case, the value of $G_{BUFFER}$ may be selected to adjust the amplified voltage output $V_{AMPOUT}$ to be within different logical voltage ranges depending on operation and timing of the circuit.

The matched signal diodes 240 (D1A) and 250 (D1B) may be controlled based on voltages generated by the biasing currents $I_1$ and $I_2$ respectively output from resistors R1 and R2, values of the input voltage $V_{IN}$ and the output voltage $V_{OUT}$, and/or a combination of the aforementioned voltages. In one embodiment, the diodes 240 and 250 are controlled to alternately conduct depending on the particular period of operation of the rectifier. The alternating states of the diodes cause voltages V+ and V− input into the differential amplifier 220 to change relative to one another. For example, V+ will be greater than V− in some periods and V+ will be less than V− in other periods in order to control switching of the transistor 260, and ultimately to generate the rectified output at the $V_{OUT}$ terminal.

In one embodiment, the voltages generated by the biasing currents passing through resistors R1 and R2 are constant values. In this case, changing values of the input voltage $V_{IN}$ and the output voltage $V_{OUT}$ (e.g., the voltage drop across transistor 260) effectively determines the values of voltages V+ and V− input into the differential amplifier 220 as the AC input signal oscillates. For example, diode 240 conducts when the AC input signal decreases below the conduction voltage of diode 240 relative to biasing voltage generated by current $I_1$. When the AC input signal increase above the conduction voltage of diode 240 relative to the biasing voltage generated by current $I_1$, diode 240 transitions into a non-conductive state to prevent a reverse current from flowing to the differential amplifier 220 and biasing current source 210. Diode 250 may operate in an analogous manner based on the voltage $V_{OUT}$ relative to the voltage generated by biasing current $I_2$.

Figure 3:
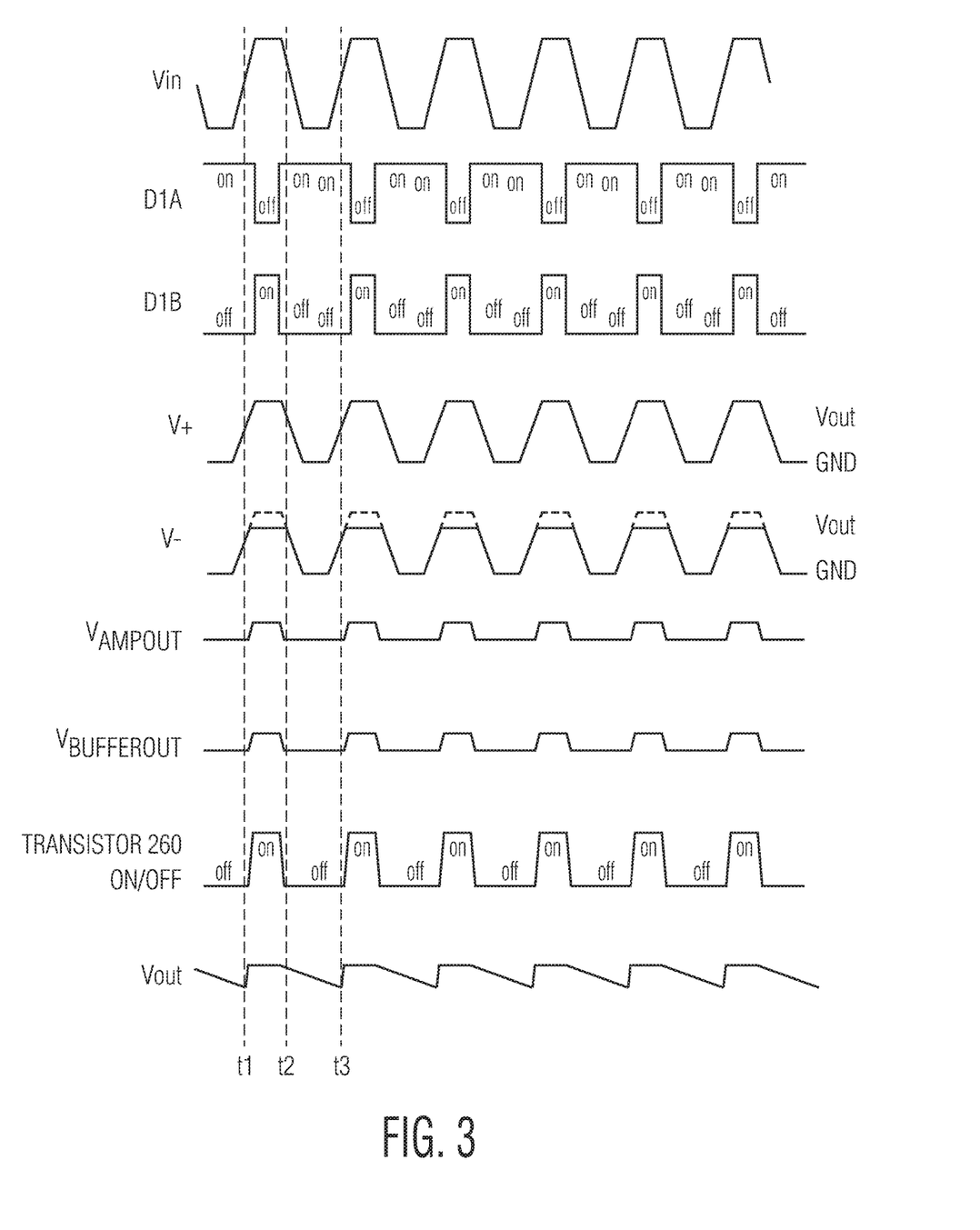
FIG. 3 illustrates a first waveform diagram for the synchronous rectifier.

FIG. 3 illustrates one embodiment of a timing diagram for explaining operation of the synchronous rectifier 11 of FIG. 2. As shown in FIG. 3, the voltage $V_{IN}$ of the input AC signal does not have an ideal waveform, for example, because of distortion produced by the winding in the receiver and the resonating capacitor $C_r$. In the example shown, the voltage $V_{IN}$ of the input AC signal may be a distorted sinusoidal signal. The voltage $V_{OUT}$ of the output signal is rectified to effectively form a DC signal which may be used to drive the load $R_L$.

Before time t1, voltage $V_{IN}$ is in the lower voltage range of its cycle. The lower voltage range includes voltages that are less than the constant voltage produced at the output node of resistor R1 by biasing current $I_1$. As a result, transistor (D1A) 240 conducts (ON) and the input voltage V+ into the differential amplifier 220 follows the input waveform $V_{IN}$ in a proportional manner. The voltage V+ is less than the voltage V− input into the differential amplifier 220 at this time, which voltage V− is a constant value generated at the output node of resistor R2 by biasing current $I_2$.

At the time before t1, voltage V− has a value which causes diode (D1B) 250 to be in a non-conduction (OFF) state. As a result, the voltage V− may have a waveform that may have a similar form to voltage $V_{IN}$ of the input AC signal but with values that are less than the voltage values of V+ at this time. Because V+<V− (or equivalently, $V_{IN}$<$V_{OUT}$) before t1, the voltage $V_{AMPOUT}$ output from the differential amplifier 220 is in a voltage range corresponding to a logical 0 value. Because the voltage $V_{BUFFEROUT}$ corresponds to the output voltage $V_{AMPOUT}$ of the differential amplifier 230, the output voltage $V_{BUFFEROUT}$ of the buffer has a logical zero value, which places transistor 260 in the off state.

The off state of transistor 260 ensures that diode 250 will not conduct during this time period and causes the output voltage $V_{OUT}$ to begin to decrease. As shown by the $V_{OUT}$ waveform, the output voltage is controlled to decrease by only a predetermined amount, which may be ensured by the switching frequency of transistor 260 (as determined by the frequency of the input AC signal).

Between time t1 and time t2, the voltage $V_{IN}$ of the input AC signal transitions into a higher voltage range of its cycle. The voltages of $V_{IN}$ place diode 240 in a non-conduction (OFF) state. As a result, the voltage V+ assumes a value that is generated based on the voltage drop across resistor R1. This voltage of V+ is greater than the voltage V− at between times t1 and t2, since diode 250 is in a conduction state (ON). Because V+>V− (or equivalently, $V_{IN}$>$V_{OUT}$), the voltage $V_{AMPOUT}$ output from the differential amplifier 220 is in a voltage range corresponding to a logical 1 value. Because the voltage $V_{BUFFEROUT}$ corresponds to the output voltage $V_{AMPOUT}$ of the differential amplifier 230, the output voltage $V_{BUFFEROUT}$ of the buffer 230 has a logical one value, which places transistor 260 in the on state.

The on state of transistor 260 during this period produces a rapid step up in voltage at the output terminal $V_{OUT}$, which may be maintained for the duration that the output voltage $V_{BUFFEROUT}$ of the buffer 230 has a logical one value, e.g., for as long as transistor 260 in the on state.

Between time t2 and t3, the same conditions exist as existed in the period before t1, as previously described. The result of these conditions ($V_{IN}$<$V_{OUT}$) is to generate a decreasing output voltage $V_{OUT}$, until the voltage is once again stepped up and maintained at a high value when $V_{IN}$>$V_{OUT}$ once again. This cycle continues until a rectified signal is generated which effectively corresponds to a DC voltage for use in driving the load.

Figure 4:
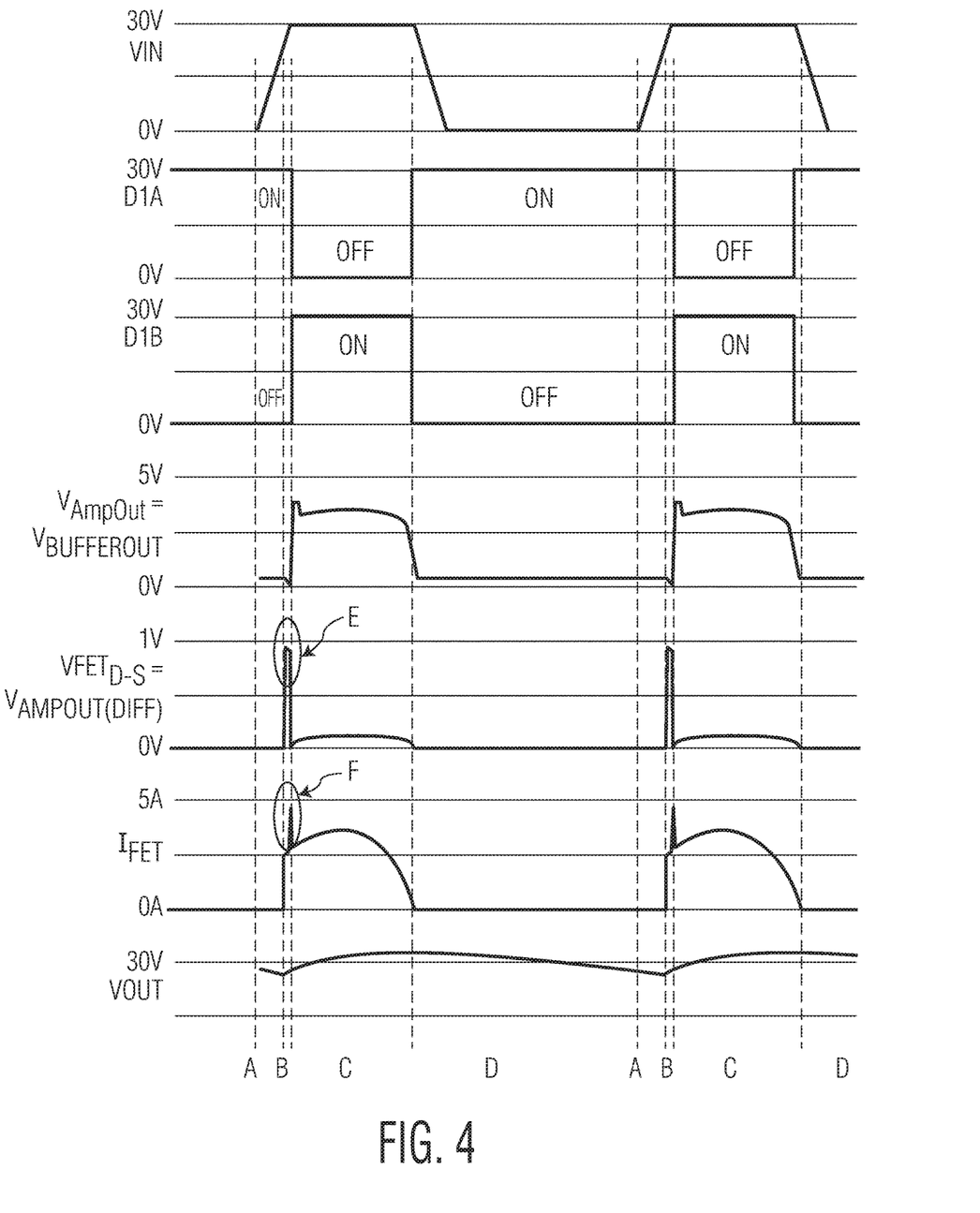
FIG. 4 illustrates a second waveform diagram for the synchronous rectifier.

FIG. 4 illustrates another timing diagram for explaining operation of the synchronous rectifier 11 of FIG. 2. The timing diagram of FIG. 4 may provide a more detailed indication of the some of the waveforms of FIG. 3 and additionally includes waveforms corresponding to the drain-source voltage across transistor 260 (VFET$_{D-S}$) and the current (I$_{FET}$) passing through this transistor. The operational times are denoted A, B, C, and D in this embodiment.

At time A, voltage V$_{IN}$ is rising from a lower voltage range of its cycle (but remains less than V$_{OUT}$). As in the timing diagram of FIG. 3, the lower voltage range includes voltages that are less than the constant voltage produced at the output node of resistor R1 by biasing current I$_1$. As a result, transistor (D1A) 240 conducts (ON) and the input voltage V+ into the differential amplifier 220 follows the input waveform V$_{IN}$ in a proportional manner. The voltage V+ is less than the voltage V− input into the differential amplifier 220 at this time, which voltage V− is a constant value generated at the output node of resistor R2 by biasing current I$_2$.

At time A, voltage V− has a value which causes diode (D1B) 250 to be in a non-conduction (OFF) state. As a result, the voltage V− may have a waveform that may have a similar form to voltage V$_{IN}$ of the input AC signal but with values that are less than the voltage values of V+ at this time. Because V+<V− (or equivalently, V$_{IN}$<V$_{OUT}$) at time A, the voltage V$_{AMPOUT}$=V$_{BUFFEROUT}$ is in a logical zero voltage range. The voltage is in the off state, which causes the drain-source voltage VFET$_{D-S}$ and current I$_{FET}$ of transistor 260 to have low values.

At time period B, the voltage V$_{IN}$ of the input AC signal transitions into a higher voltage range of its cycle and exceeds V$_{OUT}$. The voltages of V$_{IN}$ place diode 240 in a non-conduction (OFF) state. As a result, the voltage V+ assumes a value that is generated based on the voltage drop across resistor R1. This voltage of V+ is greater than the voltage V− in period B, since diode 250 is in a conduction state (ON). Because V+>V− (or equivalently, V$_{IN}$>V$_{OUT}$), the voltage V$_{AMPOUT}$=V$_{BUFFEROUT}$ has a logical 1 value. As a result, transistor 260 is placed in the on state, as indicated by the spike E corresponding to the drain-source voltage VFET$_{D-S}$ waveform and the increase in current I$_{FET}$ of transistor 260. More specifically, the voltage spike E corresponds to the case where initial conduction current flows through the body diode of transistor 260, as the differential amplifier output slews to turn on the MOSFET transistor 260. When transistor 260 turns on, the output voltage V$_{OUT}$ reverses direction and begins to increase.

At time period C, the output voltage of the differential amplifier V$_{AMPOUT}$ exceeds the gate-to-source threshold voltage (Vgs) of transistor 260. As a result, the transistor 260 begins conducting through the drain-to-source channel. The voltage drop across this transistor is very low due to low drain-to-source resistance. Also, during time period C, the amplifier output voltage V$_{AMPOUT}$ maintains a substantially constant level as long as the voltage of the input AC signal remains in the higher voltage range. At the beginning of period C, a spike F occurs in the transistor current I$_{FET}$. Spike F corresponds to a current pulse in transistor 260 that occurs as a result of the body diode of this transistor being shunted by its drain-to-source resistance Rds. The abrupt change in the drain-to-source voltage VFET$_{D-S}$ (e.g., in the amount of about 0.6V) causes the current pulse. Thereafter, the transistor current follows an increasing and then decreasing waveform, but the output voltage V$_{OUT}$ may increase to a peak voltage and be maintained throughout the remainder of period C.

When the synchronous rectifier 22 is coupled in the manner illustrated in FIG. 1, the current I$_{FET}$ may decrease in the latter part of period C. This may occur as a result of resonant coupling through the receive coil L$_r$ and series resonant capacitance C$_r$. The coil L$_r$ and capacitor C$_r$ may form a filter that helps to shape the current into a sinusoidal shape, even when the input voltage waveform somewhat square or assumes another type of distorted shape.

At time period D, the input voltage signal VIN drops to the level of the output voltage signal VOUT and the output voltage of the differential amplifier VOUT drops to nearly zero volts. As a result, the transistor 260 is turned off. Thus, in period D, the same conditions exist as existed in the time period before and at time period A. The cycle is then repeated to generate an output voltage VOUT which is effectively rectified into a DC signal of a constant voltage level.

In the example of FIG. 4, the input voltage signal V$_{IN}$ varies between 0V and 30V, the output voltage of the differential amplifier V$_{AMPOUT}$ varies in a range of 0V to about 3.5 V, the drain-to-source voltage of transistor 260 various within a range of 0V to about 1 V, the current through transistor 260 various between 0 A and about 5 A, and the output voltage signal V$_{OUT}$ varies between 0V and about 35 V. In another embodiment, all or a portion of these values may be different.

Figure 5:
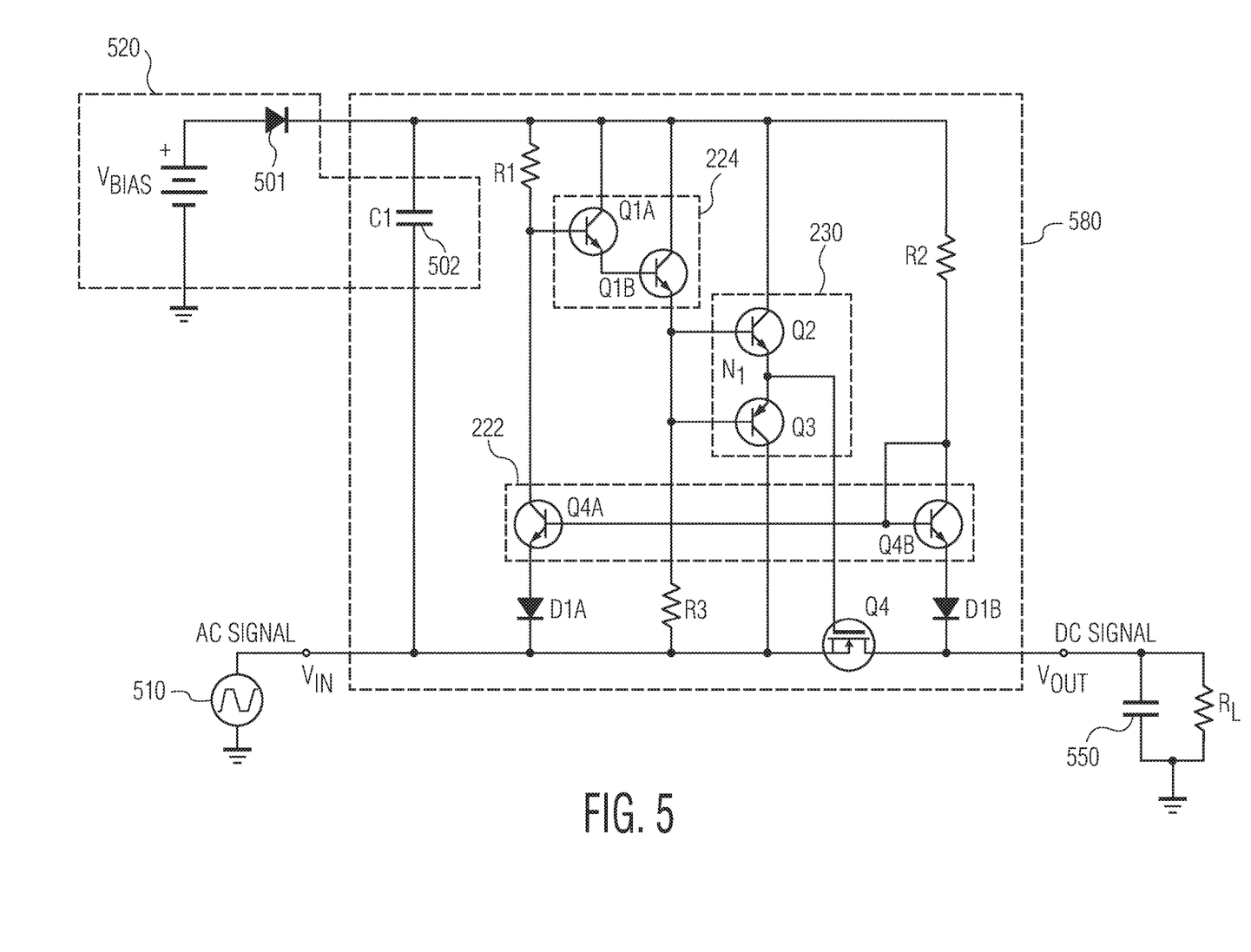
FIG. 5 illustrates another embodiment of a synchronous rectifier.

FIG. 5 illustrates an embodiment of the synchronous rectifier of FIG. 2 implemented as a half-bridge circuit. The rectifier converts an input AC power signal 510 (input into the source terminal) into a DC power signal for input into the load. In this embodiment, the analog amplifier 220 and the analog buffer 230 are implemented using bipolar junction transistors operating in the linear region, in order to control the gate signal of the MOSFET transistor 260. In FIG. 4, transistor (Q4) 260 is the main high-current pass device.

Referring to FIG. 5, a bootstrap power supply 520 is formed from bias voltage source V$_{BIAS}$, diode 501, and capacitor (C1) 502. The bias voltage source V$_{BIAS}$ provides a ground-referenced bias voltage through diode 501 in order to create a floating bootstrapped voltage. The bootstrap power supply 520 is operative when the source voltage returns to near-ground periodically to refresh (recharge) the bootstrap capacitor C1. When periodic refresh is not possible, then another method for generating the floating bias voltage may be used. Examples of other circuits that may generate the bias voltage include a charge-pump or transformer-coupled AC/DC source.

The analog amplifier 220 includes a current mirror 222 and a level shifter 224. The current mirror 222 includes a first transistor Q4A coupled to a second transistor Q4B. These transistors may be matched NPN transistors that respond to the voltage across transistor 260. In this configuration, the base of the first transistor Q4A is coupled to the base of the second transistor Q4B and the second transistor Q4B is in a diode-connected state, e.g., the base and collector of transistor Q4B are coupled together. Thus, the current flowing through resistor R2 serves as a reference current which is mirrored by the current flowing from transistor Q4A.

The level shifter 224 provides the gain of the amplifier 220 using two NPN transistors Q1A and transistor Q1B. These transistors are coupled in a Darlington configuration, where the emitter of first transistor Q1A is coupled to the base of the second transistor Q1B. In operation, transistors Q1A and Q1B operate as a single transistor which amplifies the collector current (e.g., from the bootstrap power supply) with high predetermined gain G based on the current input into the base of transistor Q1A. The current input into the base of transistor Q1A is based on the output of the current mirror 222 and the value of resistor R1. As previously indicated, in one embodiment the gain G may be in a range of 100 or more for at least some applications.

The transistors Q1A and Q1B of the level shifter 224 may therefore perform two useful functions. First, they provide a high impedance buffer to the amplifier, improving gain and offset performance. Second, they provide two-diode-drops of voltage offset, compensating for the voltage drop across diode D1A and the VCE (saturation) of transistor Q4A, in order to ensure proper turn-off of transistor 260 if necessary.

The analog buffer 230 includes a first NPN transistor Q2 and a second PNP transistor Q3. In this configuration, the emitter of the first transistor Q2 is coupled to the emitter of the second transistor Q3. The bases of transistors Q2 and Q3 are coupled between the output of the level shifter 224 and a resistor R3, which is connected to the transistor 260 between the 4 matching signal diodes (D1A) 240 and (D1B) 250. A node N1 between transistors Q2 and Q3 provides the output of the buffer, which corresponds to the gate signal for controlling MOSFET transistor 260. When the base voltage of transistor Q2 falls below its threshold voltage, transistor Q2 turns off. At the same time, transistor Q3 turns on to couple node N1 to what is at this time in the low voltage range of the input AC power signal. As a result, node N1 outputs a low signal to turn off transistor (Q4) 260. When the base voltage of transistor Q1 rises above its threshold voltage. Transistor Q2 turns on to supply a voltage that turns on transistor (Q4) 260. At the same time, transistor Q3 is turned off.

Thus, transistors Q2 and Q3 provide a high current source/sink buffer for driving transistor (Q4) 260 on and off. In one embodiment, transistor Q4 may be a power MOSFET with significant input capacitance, requiring analog buffer 230 in order to meet the turn-on and turn-off speed required to prevent excessive forward voltage drop and excessive reverse current respectively. In one embodiment, the synchronous rectifier may be implemented in an integrated circuit chip (indicated by dotted line 580) and pins corresponding to the $V_{IN}$ and $V_{OUT}$ terminals.

Figure 6:
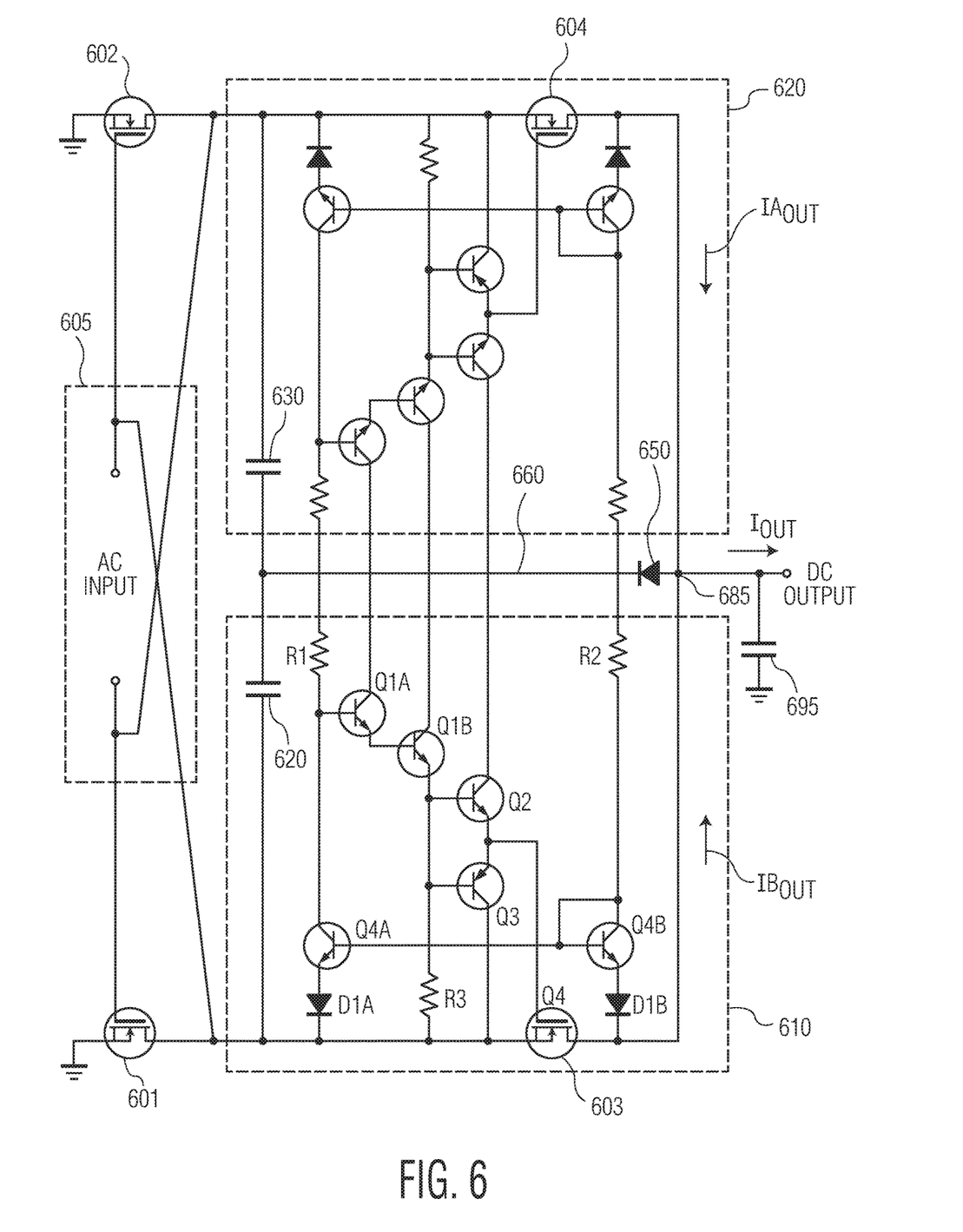
FIG. 6 illustrates another embodiment of a synchronous rectifier.

FIG. 6 illustrates an embodiment of the synchronous rectifier 22 implemented as a high-speed, high-efficiency full-wave rectifier. The full-wave rectifier includes a first stage 610 and a second stage 620. Each stage has essentially the same configuration as the synchronous rectifier of FIG. 5, with some exceptions. For example, the diodes of the bootstrap power supply are replaced with a single diode 650, and low-side rectification is accomplished by the addition of transistors 601 and 602. These transistors and transistors 603 and 604 in respective ones of the first and second stages form the transistors that are switched for the full-bridge circuit. In addition to these features, a cross-coupled circuit 605 inputs respective portions of the AC input signal into the first stage 610 and the second stage 620. As a result, stages 610 and 620 half-wave rectificy different portions of the AC input signal with a phase difference of 180°.

In addition, the bias power source for each stage 610 and 620 may be generated based on the DC output voltage from the rectifier. As illustrated in FIG. 6, the DC output voltage of the rectifier is fed back through a diode 650 along a signal path 660 coupled between the stages. The fed back voltage is input into capacitors 620 and 630 to generate the bias power for respective ones of the half-wave rectifier stages 610 and 620. Because the bias is provided based on the rectified DC output voltage, this arrangement may alleviate the need for providing power from an independent external supply, thus improving the cost and efficiency of implementing the circuit. The circuit of FIG. 6 may be suitable for a variety of wireless power applications, as well as for other uses.

Figure 7A:
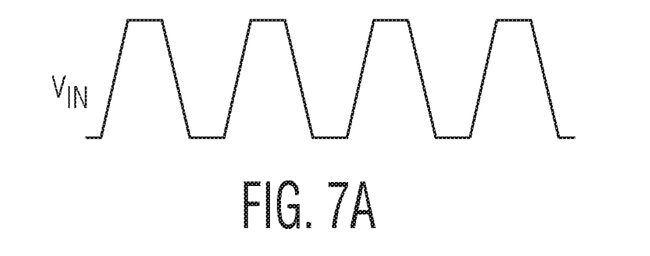
FIGS. 7A to 7D illustrate an embodiment of waveforms for the rectifier of FIG. 6.
Figure 7B:
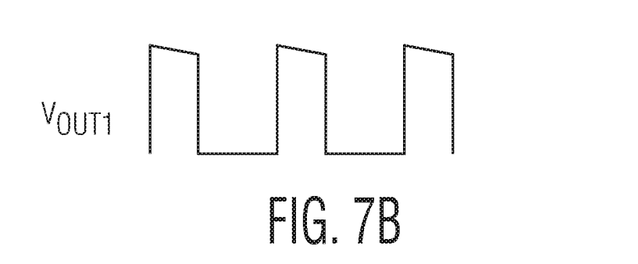
Figure 7C:
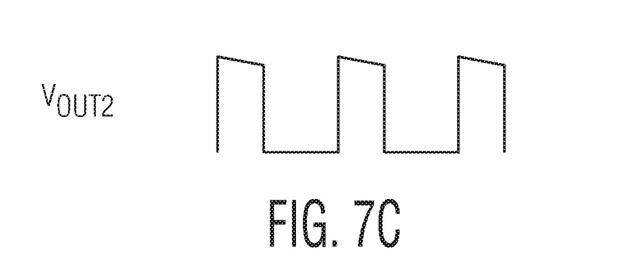

FIGS. 7A to 7D illustrate examples of waveforms that may be processed by the full-wave rectifier of FIG. 6. FIG. 7A illustrates an example of an AC input signal $V_{IN}$ for the rectifier, which input signal may correspond, for example, to the distorted sinusoidal signal of FIGS. 3 and 4. FIG. 7B illustrates a half-wave rectified waveform generated by the output current $IA_{OUT}$ of the stage 620. The half-wave rectified signal of FIG. 7B corresponds to positive peaks of the AC input signal $V_{IN}$, which peaks are generated by the output current $IA_{OUT}$ of stage 620. FIG. 7C illustrates a half-wave rectified waveform generated by the output current $IB_{OUT}$ of the stage 610. The half-wave rectified signal of FIG. 7C corresponds to negative peaks of the AC input signal $V_{IN}$, which peaks are generated by the output current $IB_{OUT}$ of stage 610. The waveforms in FIGS. 7B and 7C are shifted 180° relative to one another.

Figure 7D:
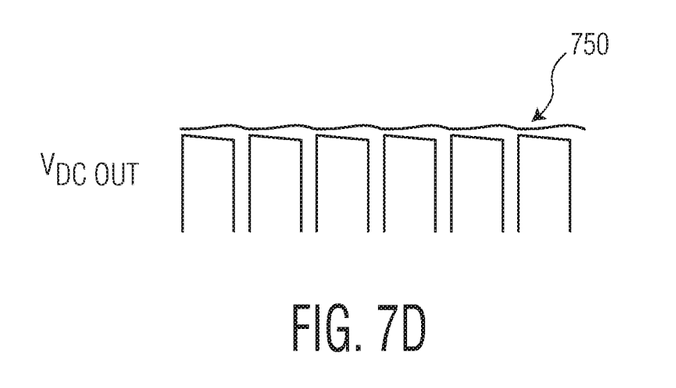

FIG. 7D illustrates the resulting rectified waveform 750. This waveform is generated based on the currents $IA_{OUT}$ and $IB_{OUT}$ that are alternately output from the stages 620 and 610. Because these currents are alternately output from the stages through node 685, currents $IA_{OUT}$ and $IB_{OUT}$ alternately charge a capacitor 695 to generate the rectified waveform 750 with a substantially constant voltage level that corresponds to the DC output voltage. In this embodiment, the capacitor 695 may be different from the capacitor 550 of FIG. 5. For example, the capacitor 550 of FIG. 5 is shown to be an external element of the rectifier coupled to the output terminal $V_{OUT}$, where capacitor 675 is an internal element that is coupled to the output terminal of the recitifier. In another embodiment, only one of capacitor 550 and 695 may be present on either side of the output terminal. In one embodiment, the rectifier may be formed on an integrated circuit chip. In this case, the input and output voltage terminals may correspond to inputs and outputs of the chip.

Figure 8:
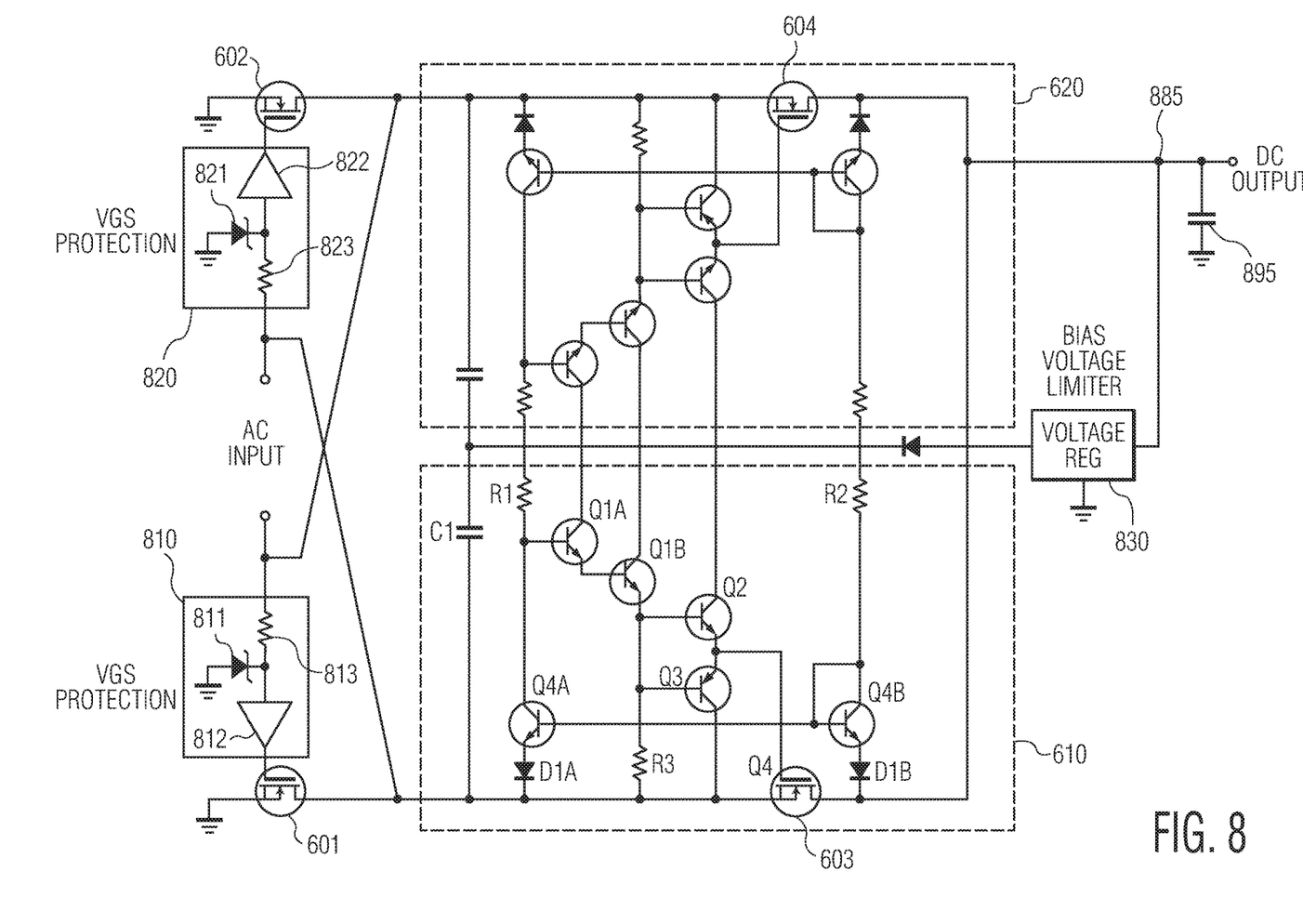
FIG. 8 illustrates another embodiment of a synchronous rectifier.

FIG. 8 illustrates another embodiment of synchronous rectifier 22 implemented as a high-speed, high-efficiency full-wave rectifier. This embodiment is similar to the rectifier of FIG. 6, except that two protection circuits 810 and 820 are included along with a voltage regulator 830. Such a rectifier may be used in various applications, including but not limited to high voltage applications.

Referring to FIG. 8, protection circuit 810 is coupled between transistor 601 and a respective one of the AC input terminals and includes a zener diode 811, a buffer 812, and a resistor 813. In operation, the protection circuit 810 operates as a voltage limiter to prevent excessive gate-to-source voltage (Vgs) from being input into transistor 601. When the voltage of the AC input signal passing through the resistor exceeds the breakdown voltage of the zener diode 811, the zener diode conducts in a reverse direction to channel the excessive voltage to ground. The breakdown voltage of the zener diode 811 may be set, for example, to a value just below a critical gate-to-source voltage that would damage transistor 601 or otherwise cause it to malfunction. The buffer 812 may operate as a gate driver that provides a fast turn-on of the MOSFET 601. Without the gate driver, the resistor 813 may limit the turn-on speed of this MOSFET.

The protection circuit 820 includes a zener diode 821, a buffer 822, and a resistor 823. The protection 820 also operates as a voltage limiter, in a manner analogous to the voltage limiter of protection circuit 810 relative to limiting the gate-to-source voltage (Vgs) of transistor 602 and channeling excessive voltage through the resistor 823 and zener diode 821 when its breakdown voltage is exceeded.

The voltage regulator 830 is coupled between output node 885 and capacitor 895 and operates to limit the bias voltage of the circuit. In operation, when the voltage fed back from the output node 885 exceeds a predetermined threshold, the voltage regulator 830 clips the voltage (or otherwise limits this voltage) to prevent an excessive amount of voltage from generating the bias volage for the two stages 610 and 620.

Figure 9:
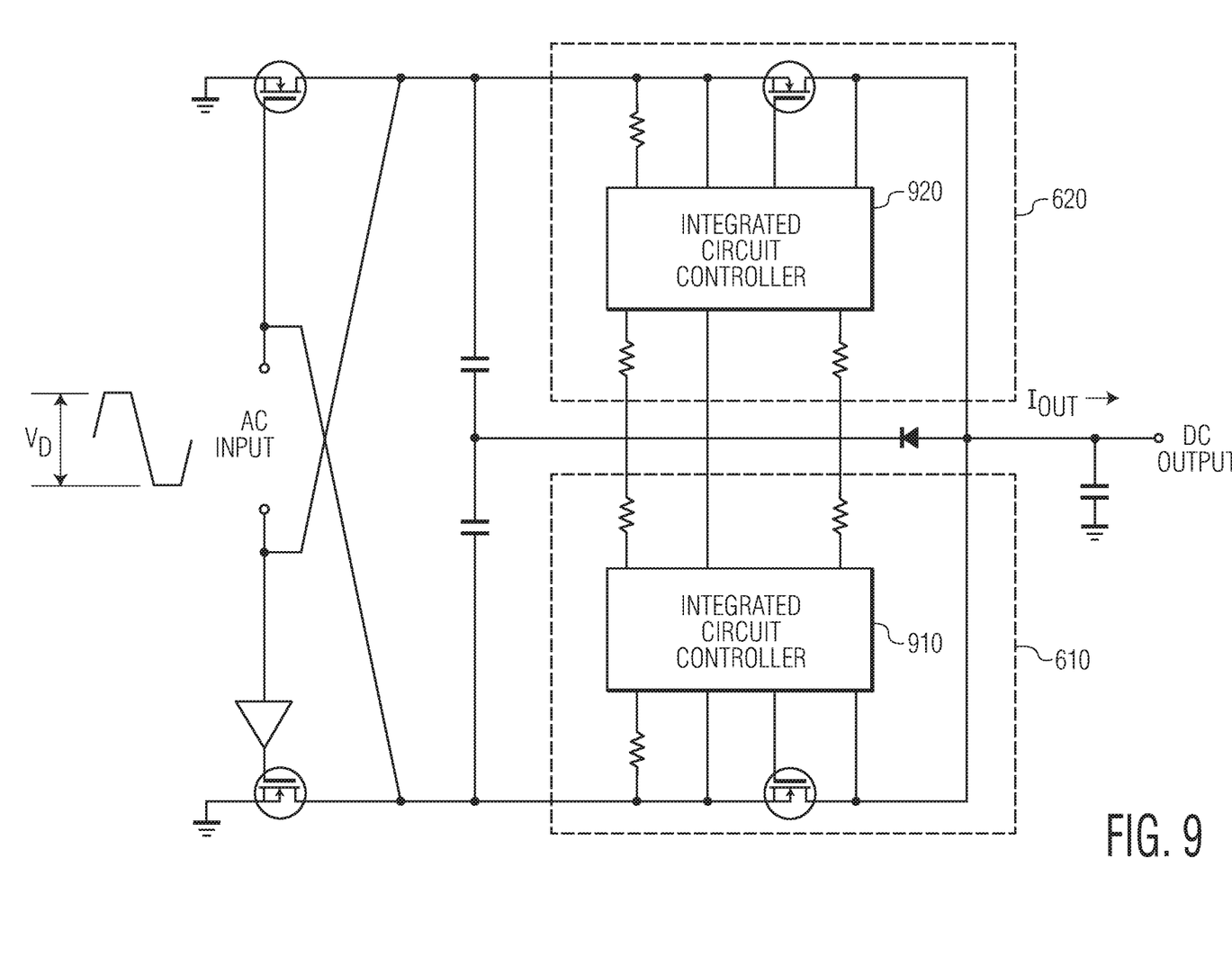
FIG. 9 illustrates another embodiment of a synchronous rectifier.

FIG. 9 illustrates an embodiment of the full-wave rectifier of FIG. 6 implemented using integrated circuits. In this embodiment, a first integrated circuit 910 may include all of the discrete elements for controlling generation of the output current for stage 610. Similarly, a second integrated circuit 920 may include all of the discrete elements for controlling generation of the output current for stage 620. In FIG. 9, the integrated circuits are referred to as integrated circuit controllers.

In accordance with one or more embodiments, a synchronous rectifier is provided which may demonstrate high power conversion efficiency (and low power loss) and which may operate with low conduction losses during the conduction phase. The synchronous rectifier may also demonstrate very fast turn-on and turn-off in order to avoid reverse current flow and may also have a high stand-off voltage during periods when the input coil voltage is lower than the output voltage. Such a rectifier may be suitable for use in many modern systems (including the Qi standard), which use high frequency signals that require extremely fast response of the synchronous rectification function. In accordance with at least one embodiment the rectifier described herein may use a linear closed-loop method, with integrated voltage blocking, to perform a high speed, low loss rectification process, even with complex, non-repetitive AC input signals.

In one or more embodiments, a full-wave rectifier uses two identical, ultra-fast, ideal diode linear control circuits as the two high-side pass elements. Also, two MOSFETs configured in a self-biasing configuration are used to replace the two low-side pass elements. Also, an output capacitor may be used for energy storage and voltage stabilization. In operation, an AC input signal is properly rectified with very low losses, with the energy transferred to the output capacitance and the system load. The AC input signal may be provided from a coupled inductor, transformer winding, or another signal source, and optionally resonating series capacitors (e.g., as may be required to optimize power transfer in a resonant topology such as Qi)) may be used.

The signal-generating, signal-regulating, and signal-processing features of the embodiments disclosed herein may be implemented in logic which, for example, may include hardware, software, or both. When implemented at least partially in hardware, the signal-generating, signal-regulating, and signal-processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the signal-generating, signal-regulating, and signal-processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

I claim:

1. A rectifier, comprising:
   a MOSFET transistor;
   a differential amplifier with a predetermined gain, having a first input, a second input, and an output, configured to generate an amplified signal at the output based on a difference $\Delta V$ between a voltage $V+$ on the first input and a voltage $V-$ on the second input;
   an analog buffer coupled to the output of the differential amplifier, wherein the analog buffer is configured to output a gate signal for switching the MOSFET transistor based on the amplified signal, and the switching of the MOSFET transistor converts an AC signal corresponding to an input signal voltage $V_{IN}$ to a rectified DC signal corresponding to an output signal voltage $V_{OUT}$; and
   a protection circuit, comprising
      a Zener diode connected between ground and the analog buffer, and
      a resistor connected between the analog buffer and the AC signal, wherein the protection circuit is configured to operate as a voltage limiter to block excessive gate to source voltage.

2. The rectifier of claim 1, wherein the analog buffer is further configured to be enabled and disabled based on the input signal voltage $V_{IN}$ of the AC signal.

3. The rectifier of claim 1, further comprising:
   a first diode coupled to the first input of the differential amplifier; and
   a second diode coupled to the second input of the differential amplifier, wherein the first diode and the second diode are configured to block reverse current flow from a signal path-including the MOSFET transistor to the differential amplifier.

4. The rectifier of claim 1, wherein the predetermined gain is 100 or more.

5. The rectifier of claim 1, wherein the rectified DC signal is a half-wave rectified signal.

6. The rectifier of claim 1, wherein the difference ΔV is based on a voltage drop across the MOSFET transistor.

7. The rectifier of claim 6, wherein the first input is configured to receive a first biasing current and the input signal voltage $V_{IN}$ and the second input is configured to receive a second biasing current and the output signal voltage $V_{OUT}$, and the second biasing current is different from the first biasing current.

8. The rectifier of claim 7, wherein the first input and the second input of the differential amplifier are further configured to receive oscillations of the AC signal corresponding to the input signal voltage $V_{IN}$.

9. The rectifier of claim 8, wherein a gate signal of the MOSFET transistor varies based upon the first input and the second input of the differential amplifier.

10. A rectifier, comprising:
 a first stage configured to convert an AC signal into a first rectified signal; and
 a second stage configured to convert the AC signal into a second rectified signal, wherein each of the first stage and the second stage includes:
 (a) a MOSFET transistor,
 (b) a differential amplifier with a predetermined gain, having a first input, a second input, and an output, and
 (c) an analog buffer coupled to the output of the differential amplifier; wherein the differential amplifier is configured to generate an amplified signal based on a difference ΔV between a voltage V+ on the first input and a voltage V− on the second input, the analog buffer is configured to output a gate signal for switching the MOSFET transistor based on the amplified signal, and the switching of the MOSFET transistor converts an AC signal corresponding to an input signal voltage VIN to a corresponding one of the first rectified signal and the second rectified signal; and
 a protection circuit, comprising
 a Zener diode connected between ground and the analog buffer, and
 a resistor connected between the analog buffer and the AC signal wherein the protection circuit is configured to operate as a voltage limiter to block excessive gate to source voltage.

11. The rectifier of claim 10, wherein the AC signal is generated based on output of a wireless power transfer coil.

12. The rectifier of claim 10, wherein the first rectified signal is shifted in phase relative to the second rectified signal to generate a DC signal, the first rectified signal corresponds to a first portion of the AC signal, and the second rectified signal corresponds to a second portion of the AC signal different from the first portion of the AC signal.

13. The rectifier of claim 12, further comprising:
 a capacitor coupled to a node commonly connected to the first stage and the second stage.

14. The rectifier of claim 13, wherein the first stage is configured to generate a first current, the second stage is configured to generate a second current, and the first current and the second current are alternately applied to the capacitor through the node in order to generate the DC signal.

15. The rectifier of claim 10, further comprising:
 a bias circuit configured to generate a bias for the first stage and the second stage.

16. The rectifier of claim 15, wherein the bias circuit is further configured to generate the bias based on the first rectified signal and the second rectified signal.

17. The rectifier of claim 15, further comprising:
 a voltage regulator configured to limit the first rectified signal and the second rectified signal for input into the bias circuit.

18. The rectifier of claim 15, wherein the bias circuit includes a first MOSFET and a second MOSFET, and the first MOSFET, the second MOSFET, the MOSFET in the first stage, and the MOSFET in the second stage form a full-bridge circuit.

19. The rectifier of claim 18, further comprising:
 a first voltage limiter configured to limit the gate-to-source voltage of the first MOSFET, and
 a second voltage limiter configured to limit the gate-to-source voltage of the second MOSFET.

\* \* \* \* \*